US008959199B2

United States Patent
Peleg et al.

(10) Patent No.: US 8,959,199 B2
(45) Date of Patent: Feb. 17, 2015

(54) NETWORK STORAGE SYSTEM FOR A DOWNLOAD INTENSIVE ENVIRONMENT

(75) Inventors: Nir Peleg, Beer-Yaakov (IL); Or Sagi, Tel-Aviv (IL); Amnon Strasser, Tel-Aviv (IL)

(73) Assignee: Reduxio Systems Ltd., Petach Tiqva ( * ) Notice: Subject to any disclaimer, the term of this patent is extended or adjusted under 35 U.S.C. 154(b) by 132 days.

(21) Appl. No.: 12/405,734

(22) Filed: Mar. 17, 2009

(65) Prior Publication Data
US 2009/0240764 A1 Sep. 24, 2009

Related U.S. Application Data (60) Provisional application No. 61/037,390, filed on Mar. 18, 2008.

(51) Int. Cl.
*G06F 15/173* (2006.01)
*H04L 29/06* (2006.01)

(52) U.S. Cl.
CPC ............ *H04L 63/0428* (2013.01); *H04L 63/10* (2013.01); *H04L 63/1408* (2013.01)
USPC .......... 709/224; 709/200; 709/203; 709/219; 709/223; 713/150; 713/189; 713/165; 726/2; 726/3; 726/28; 726/29

(58) Field of Classification Search
USPC .......... 709/200, 203, 224, 223, 219; 713/189, 713/165, 150; 726/2, 3, 28, 29
See application file for complete search history.

(56) References Cited

U.S. PATENT DOCUMENTS

| | | | |
|---|---|---|---|
| 4,901,348 A | 2/1990 | Nichols et al. | |
| 5,253,341 A | 10/1993 | Rozmanith et al. | |
| 6,091,710 A | 7/2000 | Mawhinney | |
| 6,356,941 B1 | 3/2002 | Cohen | |
| 6,484,208 B1 * | 11/2002 | Hilland | 709/238 |
| 6,567,847 B1 * | 5/2003 | Inoue | 709/219 |
| 6,757,710 B2 * | 6/2004 | Reed | 709/203 |
| 7,039,713 B1 * | 5/2006 | Van Gunter et al. | 709/229 |
| 7,069,439 B1 * | 6/2006 | Chen et al. | 713/172 |
| 7,072,865 B2 * | 7/2006 | Akiyama | 705/51 |
| 7,107,335 B1 * | 9/2006 | Arcieri et al. | 709/224 |
| 7,249,251 B2 * | 7/2007 | Todd et al. | 713/1 |
| 7,295,673 B2 * | 11/2007 | Grab et al. | 380/239 |
| 7,543,302 B2 * | 6/2009 | Stanev et al. | 719/312 |
| 2003/0023712 A1 * | 1/2003 | Zhao et al. | 709/223 |
| 2003/0074580 A1 * | 4/2003 | Knouse et al. | 713/201 |
| 2004/0151382 A1 * | 8/2004 | Stellenberg et al. | 382/219 |
| 2005/0044365 A1 * | 2/2005 | Haukka et al. | 713/171 |
| 2005/0076209 A1 * | 4/2005 | Proudler | 713/165 |
| 2005/0091229 A1 * | 4/2005 | Bali et al. | 707/100 |
| 2005/0114291 A1 * | 5/2005 | Becker-Szendy et al. | 707/1 |
| 2006/0047531 A1 * | 3/2006 | Leung et al. | 705/1 |
| 2007/0011450 A1 * | 1/2007 | McCreight et al. | 713/165 |
| 2007/0116268 A1 * | 5/2007 | Kasahara et al. | 380/28 |

(Continued)

*Primary Examiner* — Anthony Mejia
(74) *Attorney, Agent, or Firm* — M&B IP Analysts, LLC (57) ABSTRACT

A network storage system for a download intensive environment is provided. The network storage comprises at least a data storage server (DSS) that includes an interface enabling connection of the DSS to a network at a location that enables at least a view of network transactions performed by a plurality of clients; a storage unit; and a system adapted to monitor the network transactions occurring on the network and identification of the network transactions as belonging to a registered client of the DSS, and storing in the storage the transactions with an identification corresponding to the registered client.

26 Claims, 4 Drawing Sheets

(56) References Cited

U.S. PATENT DOCUMENTS

| | | | |
|---|---|---|---|
| 2007/0256125 A1* | 11/2007 | Chen et al. | 726/18 |
| 2007/0276952 A1* | 11/2007 | Mitchell | 709/230 |
| 2008/0028458 A1* | 1/2008 | Masuhiro et al. | 726/14 |
| 2008/0045214 A1* | 2/2008 | Wen et al. | 455/435.1 |
| 2008/0072043 A1* | 3/2008 | Lee | 713/168 |
| 2009/0157987 A1* | 6/2009 | Barley et al. | 711/154 |

* cited by examiner

NETWORK STORAGE SYSTEM FOR A DOWNLOAD INTENSIVE ENVIRONMENT

CROSS REFERENCE TO RELATED APPLICATIONS

This application claims the benefit of U.S. Provisional Application No. 61/037,390 filed on Mar. 18, 2008, the contents of which are herein incorporated by reference.

FIELD OF THE INVENTION

The present invention relates generally to storage systems, and more specifically to network storage systems that are subject to heavy downloads, and even more specifically to systems that enable the sharing of individually encrypted data.

BACKGROUND OF THE INVENTION

In a typical last mile connectivity system upload/download ratios are grossly asymmetrical. Most of the content users acquire or generate is downloaded and not generated locally. In a typical scenario in which a user attempts to store content to a central location, data which has just been downloaded would be uploaded again. Considering the asymmetrical bandwidth ratios this is highly impractical. The asymmetry in the upload versus download bandwidth is evidence to such difference. In systems that are intensive on the download side, it would be advantageous to further provide a network storage system that takes advantage of this asymmetry and harness it to its advantage.

One of the challenges of today has further to do with the sharing of secure data. Such data is difficult to share between two or more users because of the need to ensure that the data is protected from those entities which are not authorized to view such data. While exchange and/or sharing is known in the art to be enabled on particular cases, such as shown in U.S. Pat. No. 6,356,941 incorporated herein merely for the useful understanding of the background of the invention, it requires the creation of a "network vault" for the exchange of secured data. Other solutions require the creation of protected channels for the exchange of such secure shared data. Of particular difficulty is the use of content addressable storage (CAS) when operating on secure data. Existing art explains how to access encrypted data in regularly accessed storage systems, but does not provide an acceptable method for using CAS in conjunction with encrypted data in situations where different users may use different encryption keys.

It would be therefore advantageous to provide a solution that enables the sharing of data in general and the sharing of secured data in particular.

SUMMARY OF THE INVENTION

Certain embodiments of the invention include data storage server (DSS). The method comprises an interface enabling connection of the DSS to a network at a location that enables at least a view of network transactions performed by a plurality of clients; a storage; and a system adapted to monitor the network transactions occurring on the network and identification of the network transactions as belonging to a registered client of the DSS, and storing in the storage the transactions with an identification corresponding to the registered client.

Certain embodiments of the invention further include a method for logging data of registered clients in a download intensive network. The method comprises capturing a data packet from the download intensive network; indexing data of the data packet with a client identification (CID) unique to the registered client, when the data packet belongs to at least one of the registered clients; storing the data in association with the client identification in a temporary storage; and storing the data in permanent storage once all packets corresponding to the data have been received.

Certain embodiments of the invention also include a method for controlling a data storage server (DSS) in a download intensive network. The method comprises receiving a download data downloaded by a registered client; comparing data to the registered client store operation on a respective virtual file system of the register client; and instructing the DSS to permanently store the data on a backend storage (BES) pool by providing an appropriate stream address, when there is match.

BRIEF DESCRIPTION OF FIGURES

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION OF EMBODIMENTS

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In accordance with certain embodiments of the invention a data storage server (DSS), typically positioned on the Internet service provider (ISP) side of the wire for sharing of secured data is provided. In accordance with one embodiment, that the DSS acts as a router/bridge and has visibility of all downloaded data. By providing proper hints from the client, a store operation can refer to a block previously seen on the network down channel. A virtual file system on the client side, or some other client-side software module, can provide those software hints, as well as represent the stored data in a conventional file based manner. The invention further teaches the use of content addressable storage (CAS) to include the handling of secured data.

In accordance with another aspect of the invention the sharing of data otherwise secured between two or more entities is enabled, thereby saving storage system space and decreasing overall access time.

Figure 1:
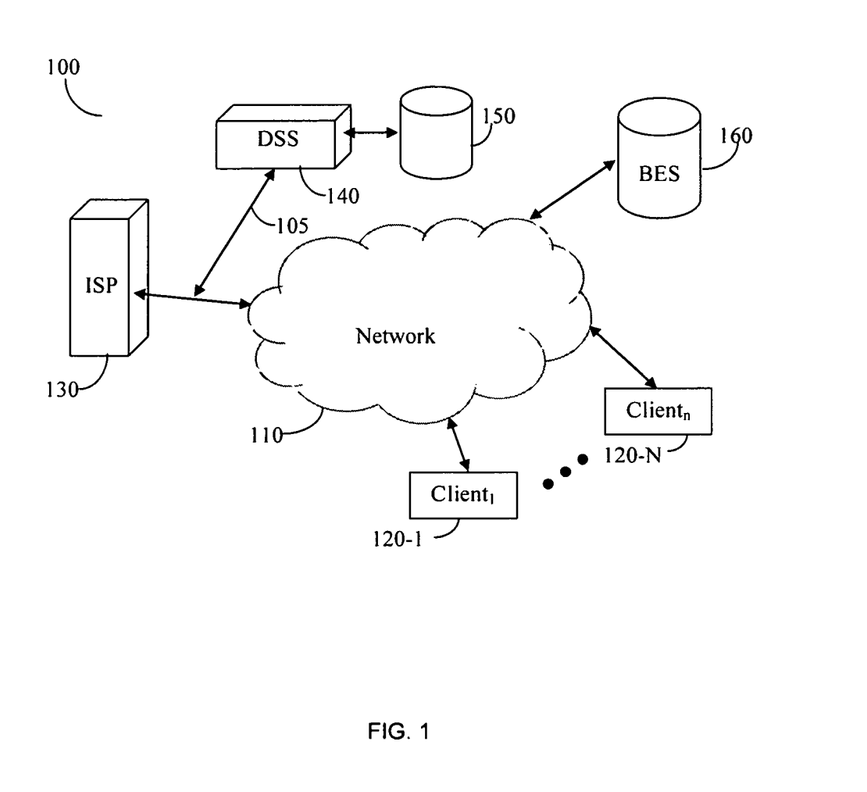
FIG. 1 is a system implemented in accordance with the principles of the invention.

FIG. 1 shows an exemplary and non-limiting network system 100, implemented in accordance with the principles of the invention. The network system 100 consists of a data storage server (DSS) 140 positioned as "a bump on the wire" on the internet service provider (ISP) 130 side. Once initialized by one of clients 120-1 through 120-N (collectively referred to as clients 120), the DSS 140 stores all the data related to that client 120, indexed with a Client Identification (CID) to a temporary storage 150, coupled to the DSS 140. Each data stream is addressable by a byte offset from the CIDs epoch. The network system 100 further consists of a back-end storage (BES) 160 pool. The clients 120, ISP 130, and BES 160 are all coupled via a network 110, the network may be a local area network (LAN), a wide area network (WAN), the world-wide web (WWW) and other types of networks as may be applicable.

Each client 120 further comprises a monitor (not shown) that monitors all the data received on the down channel to a client 120, and correlates it to storage operations performed by a user on a virtual file system. When a store operation matches a payload to a previously monitored data packet, the client 120 monitor requests the DSS 140 to permanently store the data previously stored on the temporary storage 150 on the BES 160 pool by providing the appropriate stream addresses, rather than uploading an entire data packet. The client 120 correlates the data received from the user in a storage operation to the proper byte-stream addresses. This is achieved by maintaining an association of content to byte-stream addresses in which content may be abbreviated by the use of a checksum function. In order for the monitor to isolate the payload from the control for all such data the monitor must perform on-the-fly protocol parsing. The monitor implements multiple protocol parsers for commonly used protocols. These include, but are not limited to protocols such as Simple Mail Transfer Protocol (SMTP), bittorrent, eMule, File Transfer Protocol (FTP), Hypertext Transfer Protocol (HTTP), and Post Office Protocol version 3 (POP3). The client's monitor may be further enabled to cope with out of order packet delivery.

Figure 4:
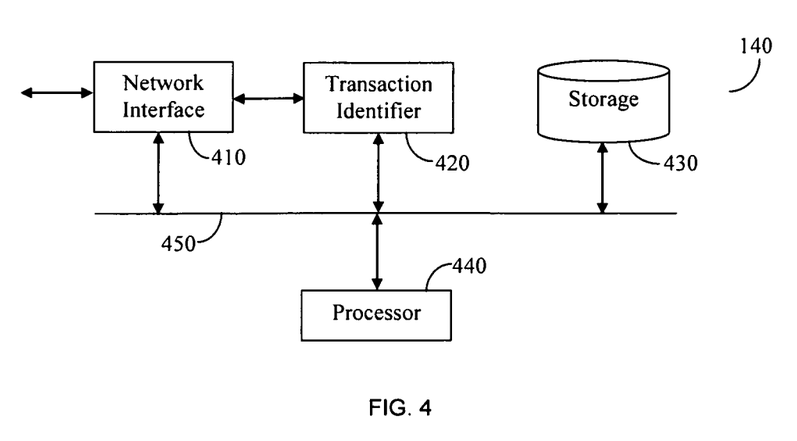
FIG. 4 is a schematic block diagram of a DDS constructed in accordance with an embodiment of the invention.

An exemplary and non-limiting block diagram of a DSS 140 is shown in FIG. 4. A network interface 410 enables the interface to a network and is coupled to a transaction identifier unit (TIU) 420 and to a DSS bus 450. The TIU 420 is further coupled to the DSS bus 450. A processor 440 is also coupled to the DSS bus 450 as well as storage 430. The processor 440 and TIU 420 together perform the tasks of at least monitoring the network transactions occurring on the network and identification of the network transactions. In one embodiment the TIU 420 is implemented by the processor 440. In some embodiments the storage 150 is part of the DSS 140.

Figure 2:
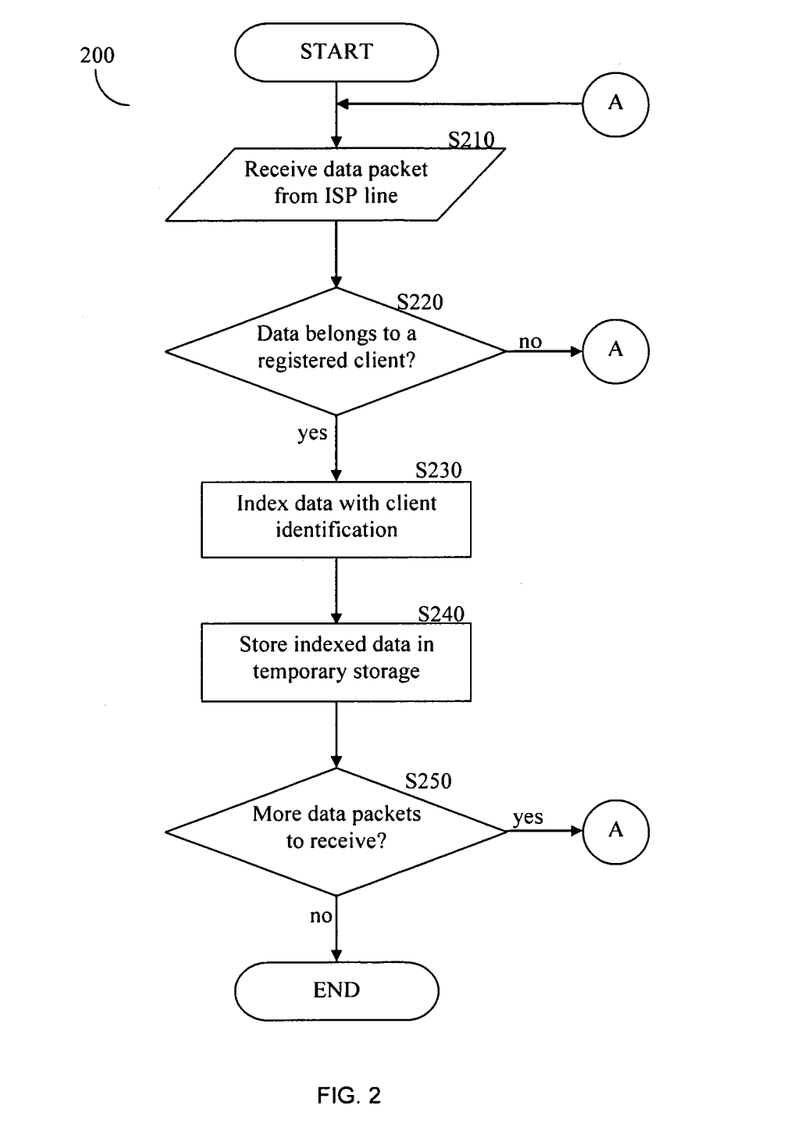
FIG. 2 is a flowchart describing the operation of the DSS realized in accordance with an embodiment of the invention.

FIG. 2 shows an exemplary and non-limiting flowchart 200 describing the operation of the DSS 140 in accordance with an embodiment of the invention. In S210, a data packet is received from the ISP line, as further described above. In S220, is it checked whether the data belongs to an already registered client, and if not the method continues with S210; otherwise, the method continues with S230. In S230 the data is indexed with the CID of the specific client 120 to which the data belongs. In S240, the data is stored in the temporary storage 150. In S250, it is checked whether more data is to be received, and if so the method continues with S210; otherwise, the method ends.

Figure 3:
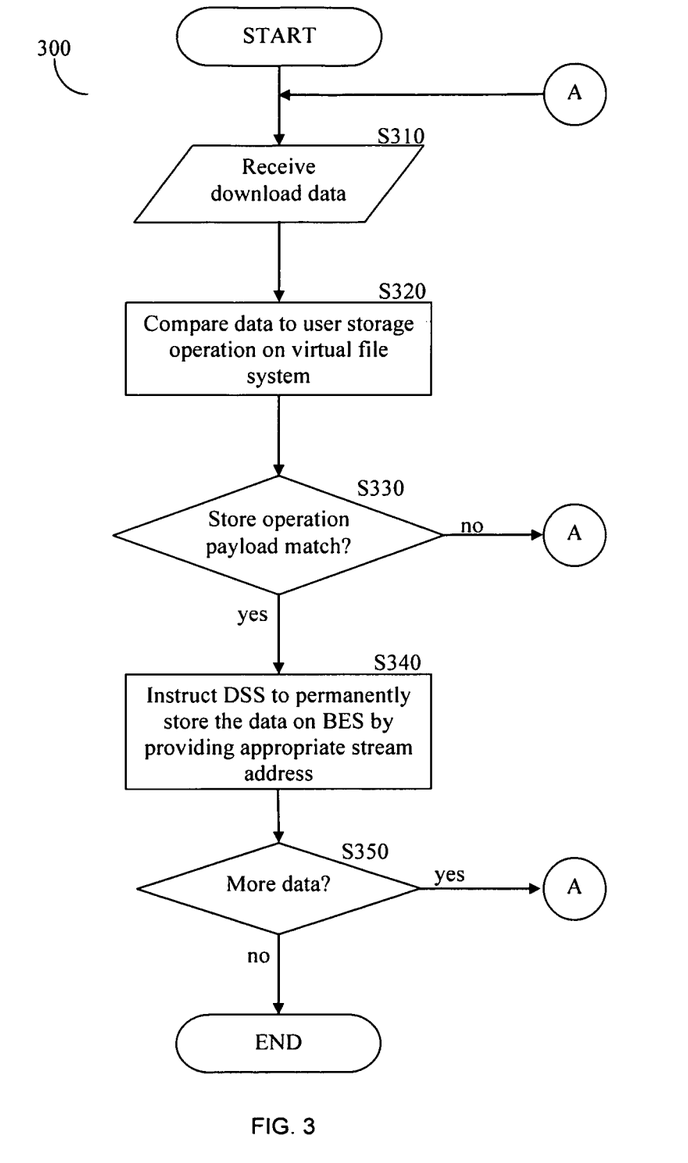
FIG. 3 is a flowchart describing the operation of a client monitor realized in accordance with an embodiment of the invention.

FIG. 3 shows an exemplary and non-limiting flowchart 300, describing the operation of a client's 120 monitor in accordance with an embodiment of the invention. In S310 download data is received. In S320 the (payload) data is compared to the user storage on its respective virtual file system. In S330, is checked whether there is a match, and if so, the method continues with S340; otherwise, the method continues with S310. In S340, the DSS 140 is instructed to permanently store the data, now on the temporary storage 150, on the BES 160, by providing the appropriate stream address. In S350, it is checked whether more data is to be received, and if so the method continues with S310; otherwise, the method terminates.

In one embodiment of the invention, the BES 160 is implemented as a content addressable storage (CAS) system. This typically allows for better utilization in many common scenarios where multiple clients store identical content, including but not limited to, storage of peer-to-peer (P2P) downloaded content. Data shared between multiple clients 120 would be therefore stored only once on the BES 160 thereby providing the advantages of the invention.

In an obfuscated channel environment such as a virtual private network (VPN), the client 120 has the ability to decrypt the data. In accordance with an exemplary embodiment of the invention the DSS 140 is not required to have that ability. In order to access the encrypted data, the client 120 should store sufficient state allowing it to decrypt the data when retrieved. The specific state that needs to be stored depends on the encryption mechanism and is considered to be outside the scope of the disclosed invention herein.

Storing encrypted data naturally hampers the efficiency of a CAS DSS 140. Therefore, when storing obfuscated data, resulting from either an obfuscated communication channel as elaborated earlier or from client-side encryption, the DSS 140 implements a proprietary secure sharing mechanism (SSM). This enables sharing between clients 120 having the same data while keeping the data opaque to other clients. This is achieved by having a client 120 store digest values in addition to data objects. The digest values are stored for the clear, rather than the encrypted data. The DSS 140 is not aware of the association between digest values and data objects. At the DSS 140 side, digest values are mere hints for triggering a data sharing operation. When the DSS 140 receives a store request for an already stored digest, the DSS 140 refers the storing client 120 to one or more previous clients 120 which have stored that digest in the past. The clients 120 may then, using direct communication, which does not necessarily have to involve the DSS 140, negotiate key exchange or re-encryption of the same data with a common key, which may or may not require re-encryption as the case may be. This is done once the negotiating clients 120 are satisfied that they indeed share the same data and hence can also share the encryption key.

Following are several non-limiting examples of the operations possible with respect to the network system 100. In the following examples the notation 'C' is for the client 120, and the notation 'S' is for DSS 140. A Store operation shall be performed as follows:

```
C→S: Array {
    Stream
    Byte offset
    Length
}
S→C: Retrieval Key/error code
```

As demonstrated above, the DSS 140 receives from a registered client 120 a Store operation including an array that consists of a stream, a byte offset and a length. Responsive of the store operation, the DSS 140 sends to the registered client 120 a retrieval key or an error code. The DSS 140 may respond with an "offset not logged" as a legitimate error code. If this condition occurs, the client 120 may choose to transmit the data to the DSS 140 and retry the operation. The storing client 120 may also implicitly subscribe to the data in the manner discussed in more detail below.

Retrieval operation of data may be performed in the following process:

```
C→S: Array {
    Retrieval key
    Offset
    Byte count
    Operation
}
S→C: {
    Array {
        Retrieval key
        Byte count/error code
    }
    Data
}
```

As demonstrated above, the Retrieve operation comprises an array that including of a retrieval key, an offset, a byte count and an operation field. The operation field may specify a simple Get Data operation or a checksum function. The registered client, in response to the retrieve operation, may send to the DSS 140 an array comprising a retrieval key and at least one of a byte count or an error code, and corresponding data.

A client 120 may subscribe to data in the following manner:

```
C→S: n Retrieval keys
S→C: Array {
    Retrieval key
    Ack/error
}
```

This operation is used when a client 120 wishes to join, or otherwise co-own, existing data. That is, the client sends one or more retrieval keys and the DSS 140 responds with retrieval key and one of an acknowledgement or an error code.

In a similar manner a client 120 may also unsubscribe to data as follows:

```
C→S: n Retrieval keys
S→C: Array {
    Retrieval key
    Ack/error
}
```

This operation is only allowed to subscribed clients 120, so as to prevent malicious removal by repeating the operation, as when the referenced content counter goes down to zero, i.e., no more users for the data exist, the DSS 140 may remove the unsubscribed data from storage.

A digest may be stored by the Store Digest that operates as follows:

```
C→S: n Digest values
S→C: Array {
    Digest Value
    Store status (success/failure code)
    Array of clients
}
```

The DSS 1440 sends a registered client an array comprising of a digest value, a store status and an array of registered clients responsive of the storing or removing operation. Digest values are unique to the requesting client 120 and are replied with an empty array of clients 120.

Similarly the Remove Digest operation operates as follows:

```
C→S: n Digest values
S→C: Array {
    Digest value
    Ack/error
}
```

The Start operation operates as follows:
C→S: CID
S→C: Ack/error code
In the Start operation the DSS 140 sends to the registered client an acknowledgement or an error code in response to a CID sent by the client.

The Stop operation operates as follows:
C→S: CID
S→C: Ack/error code
In the Stop operation the DSS 140 sends to the registered client an array acknowledgement or an error code in response to a CID sent by the client.

The Gather operation operates as follows:

```
C→S: Array {
    Retrieval key
    Offset
    Byte count
}
S→C: Retrieval Key/error code
```

The Gather operation includes an array that further comprises a retrieval key, an offset, and a byte count sent by the client to the DSS 140. The DSS sends to the registered client a retrieval key or an error code responsive of receiving the gather operation.

The Have Data operation, an exemplary and non-limiting implementation of which is shown herein below, enables communication between two clients 120 and operates as follows:

C0→C1: Digest Value, Challenge0
C1→C0: Nack, or Ack(Digest Value, Response0, Challenge1)
C0→C1: Nack, or Ack(Digest Value, Response1)
C1→C0: Nack, or Ack(Digest Value, Retrieval Key, Decryption Key)

Basically, when encrypted data is to be shared, both sides have to check that they indeed have identical data. This is performed by sending a challenge which can be met only by those parties having the identical data in question. When both sides have confirmed their respective capability to access identical data, it is then possible to share such data in a single location using a single encryption key. Using this approach allows the use of a CAS for the shared storage of encrypted data. C0 and C1 can switch roles in providing the decryption and retrieval keys, such that C0 sends the encryption keys to C1. Which client 120 provides the keys may be determined by the amount of clients 120 subscribed to each copy of the data. This operation is triggered on the client 120 side by receiving a non-empty array of clients 120 from the DSS 140. It is received as a Store Digest response. Upon successful completion of the operation the client 120 that received the keys can delete its own copy of the stored data, if such exists, since it is now using the copy encrypted and stored by the other client 120. The client 120 may verify the authenticity of the keys by using a Retrieve operation with a checksum field. This can be used to protect against an attack scenario in which the keys exchanged, after trust establishment, fail to retrieve the original data.

The principles of the invention may be implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. A data storage server (DSS), comprising:
    an interface enabling connection of the DSS to a network at a location that enables at least a view of network transactions performed by a plurality of clients;
    a content addressable storage (CAS); and
    a system configured to monitor the network transactions occurring on the network and identify the network transactions as belonging to a registered client of the DSS, and store in the storage the transactions with an identification corresponding to the registered client, wherein the system is further configured to instruct a first client to send to a second client a digest value and a first challenge value; instruct the second client to send to the first client an acknowledgement comprising the digest value, a first response and a second challenge; instruct the first client to send the digest value and a second response; instruct the second client to send the digest value, a retrieval key and a—decryption key; and instruct the first client to delete encrypted data corresponding to the digest value, wherein the first client has access to encrypted data of the second client enabled by the retrieval key and the decryption key.

2. The DDS of claim 1, wherein the system comprises at least a processor capable of executing appropriate sequences of instructions.

3. The DSS of claim 1, wherein the system is further configured to cause the movement of data from the storage to a backend storage (BES) pool by providing an appropriate stream address.

4. The DSS of claim 3, wherein the movement of data is responsive to a request received from the registered client.

5. The DSS of claim 1, wherein the system is further configured to receive from the registered client a stored operation including an array, wherein the array comprises a stream, a byte offset and a length.

6. The DSS of claim 5, wherein the system is further configured to send to the registered client responsive of the stored operation a retrieval key or an error code.

7. The DSS of claim 1, wherein the system is further configured to receive from the registered client a retrieve operation comprising an array, wherein the array comprises a retrieval key, an offset, a byte count and an operation.

8. The DSS of claim 6, wherein the system is further configured to send to the registered client responsive of the retrieve operation an array comprising a retrieval key and at least one of a byte count or an error code, and corresponding data.

9. The DSS of claim 1, wherein the system is further configured to receive from the registered client one or more retrieval keys for one of the purposes of: subscribing to a data, unsubscribing to a data.

10. The DSS of claim 9, wherein the system is further configured to send to the registered client an array comprising a retrieval key and one of an acknowledgement or an error code responsive of the subscribing or the subscribing operations.

11. The DSS of claim 1, wherein the system is further configured to receive from the registered client one or more digest values for the purpose of storing or removing a digest from the storage.

12. The DSS of claim 11, wherein the system is further configured to send to the registered client an array comprising a digest value, a store status and an array of registered clients responsive of the storing or removing operation.

13. The DSS of claim 11, wherein the system is further configured to send to the registered client an array comprising a digest value and one of an acknowledgement or an error code.

14. The DSS of claim 1, wherein the system is further configured to receive from the registered client a gather operation comprising an array, wherein the array comprises a retrieval key, an offset, and a byte count.

15. The DSS of claim 14, wherein the system is further configured to send to the registered client a retrieval key or an error code responsive to receiving the gather operation.

16. A method for logging data of registered clients in a download intensive network comprising:
    capturing a data packet from the download intensive network;
    indexing data of the data packet with a client identification (CID) unique to the registered client, when the data packet belongs to at least one of the registered clients;
    storing the data in association with the client identification in a temporary storage;
    storing the data in permanent storage once all packets corresponding to the data have been received;
    instructing a first client to send to a second client a digest value and a first challenge value;
    instructing the second client to send to the first client an acknowledgement comprising the digest value, a first response and a second challenge;
    instructing the first client to send the digest value and a second response;
    causing the second client to send the digest value, a retrieval key and a decryption key; and instructing the first client to delete encrypted data corresponding to the digest value; wherein the first client has access to encrypted data of the second client enabled by the retrieval key and the decryption key.

17. The method of claim 16, further comprising:
waiting to receive a next data packet when data packet does not belong to at least one of the registered clients.

18. The method of claim 16, further comprising:
monitoring network transactions performed by at least the registered clients, wherein monitoring of the network transactions is performed by a data storage server (DSS) connected to the download intensive network at a location that enables the view of the network transactions.

19. The method of claim 16, further comprising:
storing data in a content addressable storage (CAS).

20. A method for controlling a data storage server (DSS) in a download intensive network comprising:
receiving a download data downloaded by a registered client;
comparing data to the registered client stored operation on a respective virtual file system of the register client;
instructing the DSS to permanently store the data on a backend storage (BES) pool by providing an appropriate stream address, when there is match;
instructing a first client to send to a second client a digest value and a first challenge value;
instructing the second client to send to the first client an acknowledgement comprising the digest value, a first response and a second challenge;
instructing the first client to send the digest value and a second response;
instructing the second client to send the digest value, a retrieval key and a decryption key; and
instructing the first client to delete encrypted data corresponding to the digest value; wherein the first client has access to encrypted data of the second client enabled by the retrieval key and the decryption key.

21. The method of claim 20, further comprising:
waiting to receive more download data when there is no match.

22. The method of claim 20, is being performed by the registered client, the registered client being previously registered on the DSS.

23. The method of claim 20, wherein the BES is a content addressable storage (CAS).

24. A method for sharing encrypted data in a data storage server (DSS) comprising:
sending a first challenge and a digest value from a first client to a second client for the purpose of confirming that an encrypted data may be jointly accessed by the first client and the second client;
receiving from the second client the digest value, a first response responsive of the first challenge and a second challenge sent from the second client;
sending from the first client to the second client the digest value and a second response responsive of the second challenge; and
receiving from the second client the digest value, a retrieval key and a decryption key; wherein the first client can access the encrypted data using the retrieval key and the decryption key without the need to store a duplicate copy of the encrypted data from the first client use.

25. The method of claim 24, further comprising:
terminating the method upon one of: no acknowledgement from the first client, no acknowledgement from the second client, failure to provide a correct the first response to the first challenge, failure to provide a correct the second response to the second challenge.

26. The method of claim 24, further comprising:
storing the encrypted data in a content addressable storage (CAS).

* * * * *